PATENTED FEB 26 1974  3,795,006

SEISMIC SHOCK RECORDER AND ANNUNCIATOR SYSTEM

BACKGROUND OF THE INVENTION

In the detection and recording of earthquakes and other mechanical shocks, there is a requirement for a class of instruments which can stand-by for long periods of time, e.g., years, without any attention, but reliably produce useful records when a shock occurs.

Such instruments commonly employ mass-spring systems with styli which scratch or emboss record lines or traces on stationary record media, such as metal plates. Being passive devices without transport mechanisms or amplifiers, they are more reliable than the usual types of strong-motion accelerographs, and are often used as backup instruments to provide data in case of failure of the more complicated equipment.

Instruments of this class will be herein called "passive resonant recorders." My prior U.S. Pat. No. 3,683,397 describes a small recorder of this class, intended for recording heavy shocks, such as explosions. It shows a new type of recording surface and a method of recovering more information from the embossed trace, than was possible with prior such instruments. The recording surface is capable of rendering detectible the points along the single-line record trace where the individual peak excursions of the stylus occurred. From these, amplitude data and a knowledge of the natural frequency of the mass-spring systems (usually in the form of reeds), the acceleration vs. time curve, may be computed. Thus, the time history of the acceleration experienced by the instrument, as well as the response spectrum, can be obtained from the records, even though the record media do not move.

My prior U. S. application, Ser. No. 203,713, filed Dec. 1, 1971, and now U.S. Pat. No. 3,740,757, describes a large recorder of this class which is intended for recording earthquake shocks. It may employ twelve reeds having natural frequencies graded in 1/3-octave intervals from 2 Hz to 25.4 Hz. A separate replaceable record plate is provided for each reed. The lower-frequency reeds in such an instrument are long and thin. Experience with this large instrument has indicated a need for improvements in the support and damping means for the reeds. It has also been found that there is a need for an annunciator system for such instruments which will display, as by lamps on a remote panel, the occurrence of deflections of reeds beyond certain predetermined limits. The present invention is addressed to these needs.

BRIEF SUMMARY OF THE INVENTION

The present invention comprises a set of improvements on passive resonant recorders of the type described in my prior U.S. Pat. No. 3,740,757 referred to above. Such recorders may employ, e.g., 12 resonant reeds, each with a mass attached to its free end, together with a stylus mounted on a light spring. A replaceable record plate is provided for each of the styli. The styli may be of diamond with tip radii of the order of 0.01 to 0.02 mm. The record plates may have plated and/or coated surfaces of, e.g., soft metals, to make detectible the individual peak excursions of the styli along the arcuate lines that they trace, as described in my above application and patent. When the case of the instrument is accelerated by a mechanical shock, the reeds are set to swinging back and forth. From microscopic observation and measurement of the embossed record traces, and from knowledge of the natural frequencies of the reeds, the response spectrum and the acceleration vs. time curve can be computed.

A reed in such an instrument may have dimensions of the order of 0.5 mm thick, 1 cm wide, and 20 cm long. In its own plane, it is quite stiff, so long as it is straight and undeflected. When substantially deflected, however, its curved shape presents a different structural shape, subject to twisting moments derived from gravitational and inertial loads normal to those being measured. When such a reed is deflected in its intended plane of oscillation, such moments may rather easily deflect its tip in a direction normal to that plane, and so change undesirably the stylus pressure on the record plate. The present invention provides for rollers or bearings on the reed tips to limit such undesirable secondary deflections in directions normal to the reeds' plane of oscillation.

The damping of reeds in prior such instruments is provided by the internal friction of the material of the reeds themselves, and by the coulomb friction of the styli against the recording surfaces. Coulomb (sliding) friction presents forces which are roughly independent of velocity, in contrast to viscous friction. According to the present invention, the damping of the reeds is better controlled by means of thin metal strips bonded to the sides of the reeds by means of elastomeric adhesives. The elastomer layers are stressed in shear as the reeds deflect, and provide predictable viscous damping in a desirable degree.

The need for an annunciator system is met by sets of contacts, closed when the reeds deflect, and connected to sets of electronic flip-flop circuits and transistor switches which energize indicator lamps or relays. The indicating devices remain energized until a manual "reset" switch is actuated. The circuits have novel provisions for high input impedance, high reliability, and low standby power consumption.

DETAILED DESCRIPTION OF THE INVENTION

In the drawing:

FIG. 5 is a diagrammatic section of a portion of a reed with damping layers bonded on;

Figure 1:
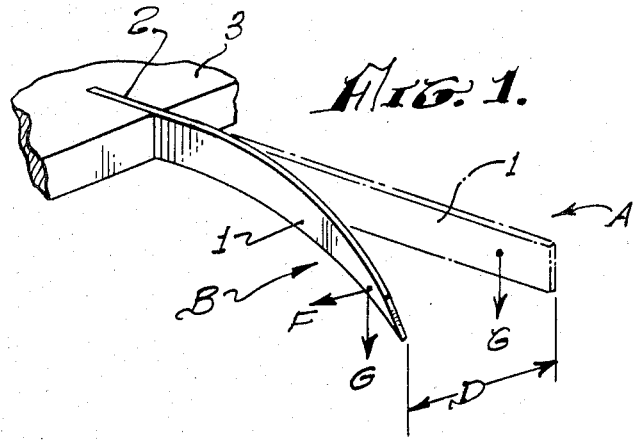
FIG. 1 is a perspective diagrammatic view of a reed, to illustrate secondary twisting.
Figure 2:
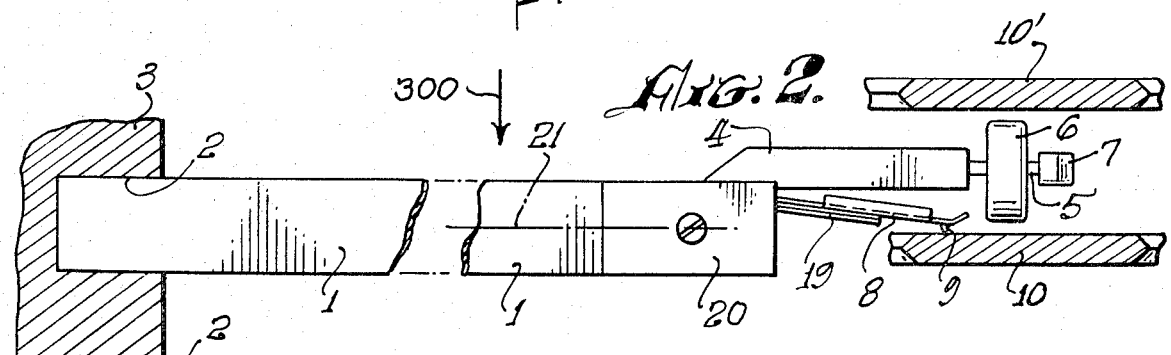
FIG. 2 is a semi-diagrammatic side view of a single reed assembly, showing the bearing support means.

In FIG. 1, a reed 1 is indicated in an undeflected position in its intended plane of oscillation at A, in dotted lines, and also in a deflected position at B, in solid lines, in the same plane. In position B, the component of the inertial force which causes the deflection D, from A to B, is indicated as an arrow F parallel to the plane of oscillation.

ANNUNCIATOR CIRCUITS

Figure 3:
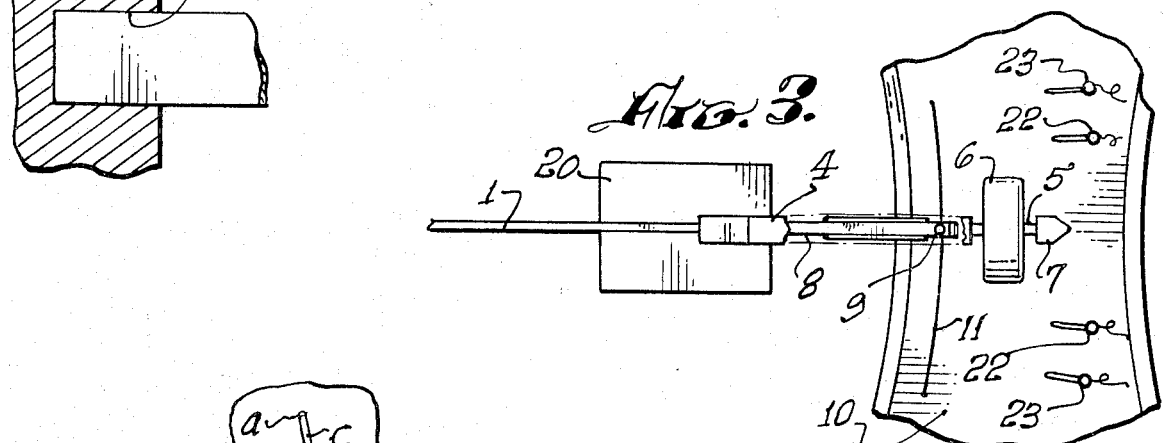
FIG. 3 is a cutaway top view of the end portion of a reed assembly and record plate.
Figure 4:
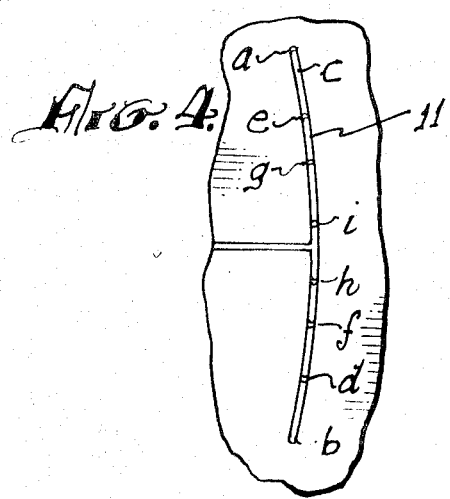
FIG. 4 is a diagrammatic enlarged view of a portion of a record trace.
Figure 5:
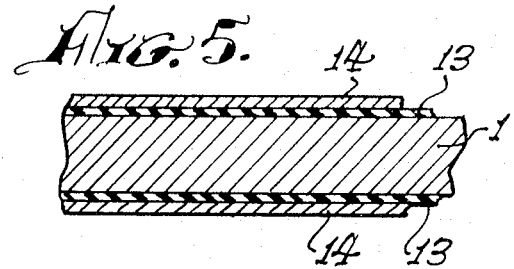
Figure 6:
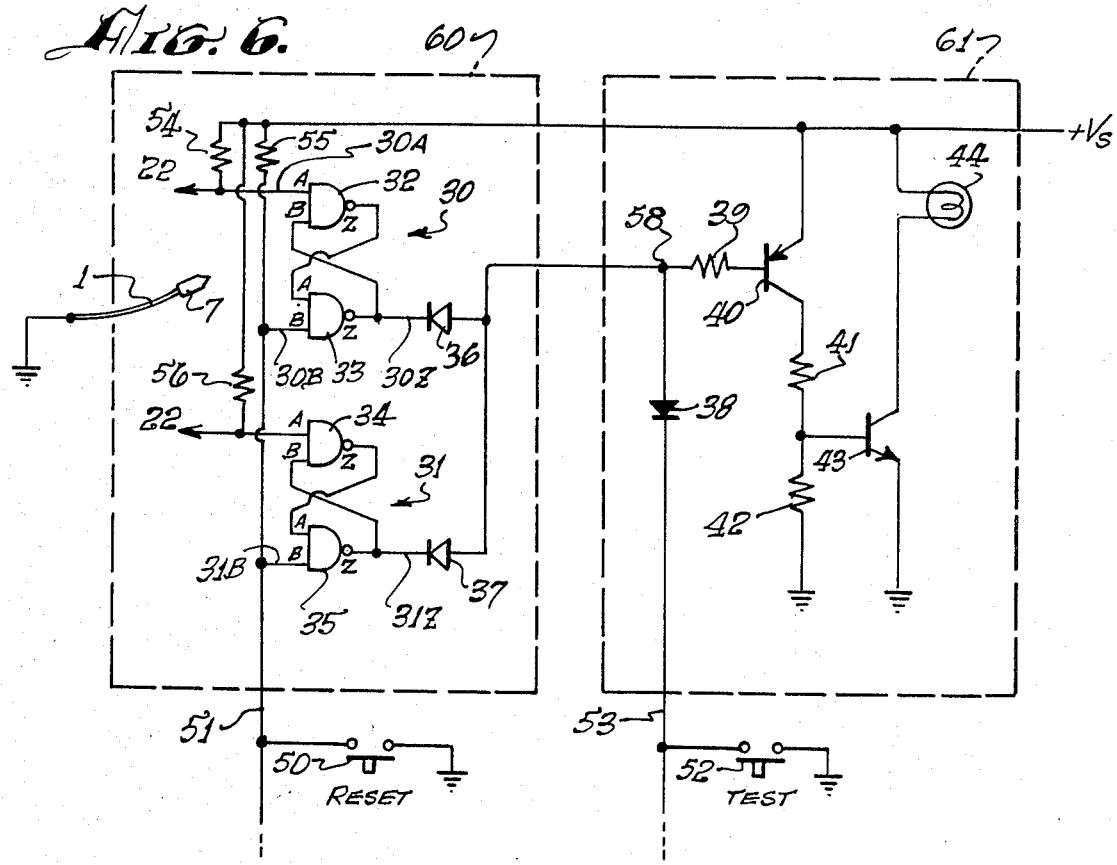
FIG. 6 is a schematic diagram, parly in block form, of a portion of an annunciator circuit.

FIG. 6 is a schematic of a single annunciator circuit channel which will actuate a lamp or relay or like display device when a reed contact is closed. A reed 1 is shown schematically, with its tip contact 7 adapted to contact momentarily either of the two stationary contacts 22. These stationary contacts may be located physically at, say 70 percent of the maximum displacement of the reed 1, as described in connection with FIG. 3. Preferably, as shown, one channel is provided for each pair of contacts associated with each reed, so that, e.g., indicator lamp 44 will light (and remain lighted until manually reset) when either of the "70 percent" contact is momentarily grounded by the reed. The "100 percent" contacts associated with that reed will preferably go to another channel with its own annunciator lamp or relay, and so on. The system block diagram, FIG. 7, will be described later.

In FIG. 6, a flip-flop circuit 30 is provided for actuation by the upper of the contacts 22, and a second identical flip-flop circuit 31 for the lower contact 22. The flip-flops may be of any known type, but are preferably made up by interconnecting pairs of commercial CMOS integrated gate circuits in known manner, as 32, 33 and 34, 35. Such circuits are commercially available packaged in groups of four, and have a very high input impedance, of the order of at least $10^9$ ohms.

In FIG. 6, the flip-flop circuitry, one unit of which is shown enclosed by dotted line 60, is preferably located inside the case of the recording instrument. The annunciator driving circuits, one of which is shown enclosed by dotted line 61, may be located physically in a separate annunciator circuit cabinet connected to the recorder by a suitable cable, not shown. Reset and test buttons 50, 52, the indicator lamps or other suitable display devices 44, and suitable power supplies, may also be mounted in the annunciator circuit cabinet.

The operation of the circuits 60 is exemplified as follows. When a contact 7 on reed 1 grounds momentarily the upper contact 22, the flip-flop 30 changes state. Its output terminal 30Z, previously at the normal potential $+V_s$ (typically = 12 volts with respect to ground), goes to 0 or ground potential. This causes transistor 40 to conduct, which in turn causes transistor 43 to conduct, which lights indicator lamp 44. Lamp 44 may obviously be replaced by any other suitable device, such as a relay. Resistors 39, 41, and 42 are conventional load and current-limiting resistors.

Figure 7:
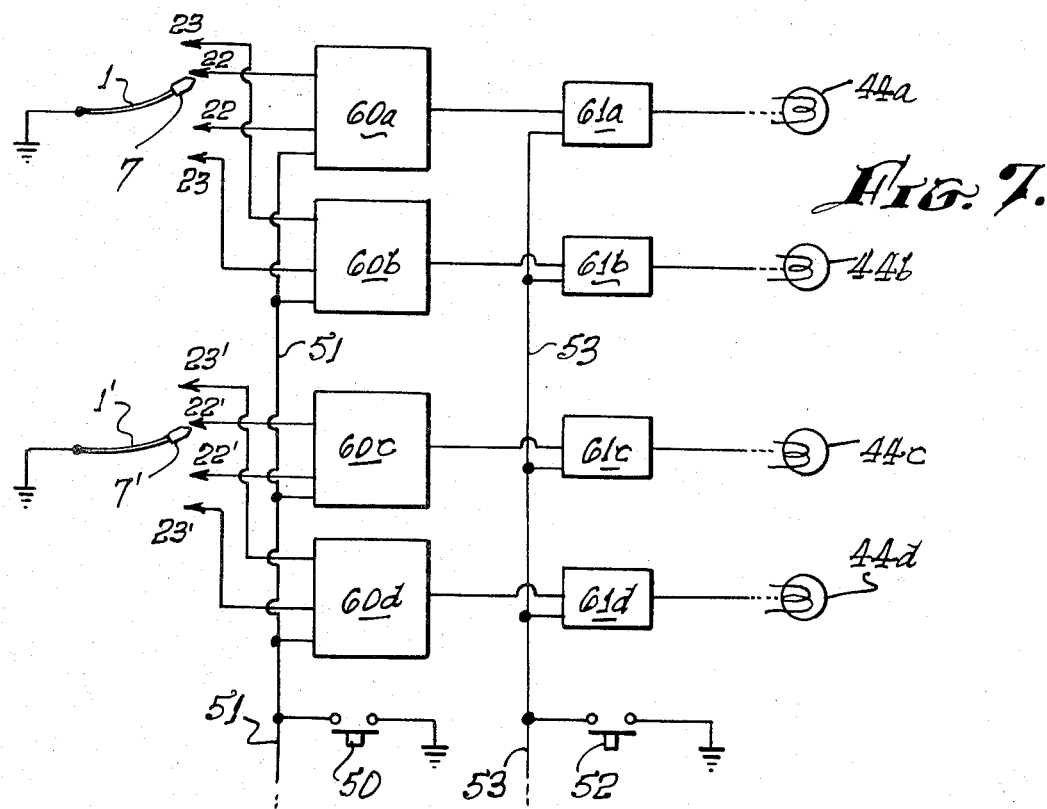
FIG. 7 is a block diagram of an annunciator system for a plurality of reeds.

If reed contact 7, FIG. 7, touches first the lower stationary contact 22 instead of the upper one, the flip-flop circuit 31 is made to change its state. Its output terminal 31Z will then change its potential from the supply potential $+V_s$ down to ground, or 0 volts, and produce the same effect, causing transistors 40 and 43 to conduct and lighting the indicator lamp 44.

Indicator lamps 44 or other suitable such devices, once energized by a momentary grounding of a contact such as 22, will remain energized until the system is reset. Reset is done by momentarily closing the reset switch 50, which grounds all the B input terminals, such as 30B, 31B, of all the flip-flops via a common bus 51.

A "Test" switch 52 is also provided to test the annunciator drive circuits and annunciator display devices, such as lamps 44. The test switch 52, FIG. 6, grounds a bus 53. Bus 53 goes to all the driver circuits such as 61, connecting to point 58 through an isolating diode 38 in each such driver circuit. When test switch 52 (preferably a push-button switch) is closed, all the lamps 44 will light up. When the test switch 52 is opened again, the system will revert to its former state, since any lowering of the potential of driver input point 58 will be isolated from the flip-flop circuits by the coupling diodes such as 36, 37.

When the system is first turned on, the flip-flop output terminals, such as 30Z, 31Z, will be pulled up to the supply potential $+V_s$ via the forward conduction of the diodes such as 36, 37, and forward conduction of the base-emitter junction of transistors such as 40. This automatic setting feature insures that all the flip-flops will be in the correct (standby) state whenever the system is turned on. Resistor 39 is a protective current-limiting resistor, to limit current into the flip-flops to a safe value.

Current through transistors 40 and 43 is protectively limited by another resistor 41, in known manner. Resistor 42 is a conventional load resistor.

In the normal, unactuated "standby" state, transistors 40 and 43 are both non-conducting, and draw no current. The output terminals of the flip-flop circuits such as 30, 31 are all at $+V_s$ potential. The state of any flip-flop is changed from "standby" to "actuated" by momentarily grounding its A input, such as point 30A, and restored to "standby" by momentarily grounding its B input, such as 30B.

In the preferred form of the invention, as noted above, the flip-flops may be made up of interconnected pairs of commercial CMOS (Complementary Metal-Oxide Semiconductor) integrated gate circuits. These are available in groups of four in a single package. To enhance the reliability of the system, the invention contemplates distributing the gate circuitry for any single reed, among different packages. Thus, in FIG. 6, the gates 32 and 33 may be in one package, and the gates 34 and 35 in another. If one package should fail, the circuitry for the lower contact 22 would still be functioning. This feature is further described below in connection with FIG. 8.

FIG. 7 shows a portion of a whole system in block form, to illustrate the allocation of the flip-flop circuit groups and annunciator driver groups. The "70 percent of full deflection" pair of contacts 22 for a reed 1 will go to the "A" inputs of one pair of flip-flops, in block 60a. The "100 percent" contacts will go to another similar block 60b. Each of these blocks feeds an individual annunciator driver circuit, 61a, 61b.

Another reed such as 1', FIG. 7, serves a similar set of contacts 22', 23', going to additional identical flip-flop blocks 60c, 60d, which in turn feed identical annunciator driver blocks 61c, 61d, and so on for all the reeds. Each driver 61a–61d, ... is connected to its own indicator lamp or other suitable display device 44a–44d, ....

The high input impedance of the preferred CMOS form of flip-flop circuits permits the use of high input resistors, and reliable operation, even though the initial contact resistance between contacts such as 7 and 22 may be high. Such high contact resistance may occur due to oxidation of the contact surfaces or to condensation of the vapors of organic insulating materials on these surfaces. The resistors, such as 54, 55, and 56, FIG. 6, may be 1 megohm, and the circuits, such as 30, 31, will change state reliably, even though the contact resistances be of the order of 100,000 ohms.

Figure 8:
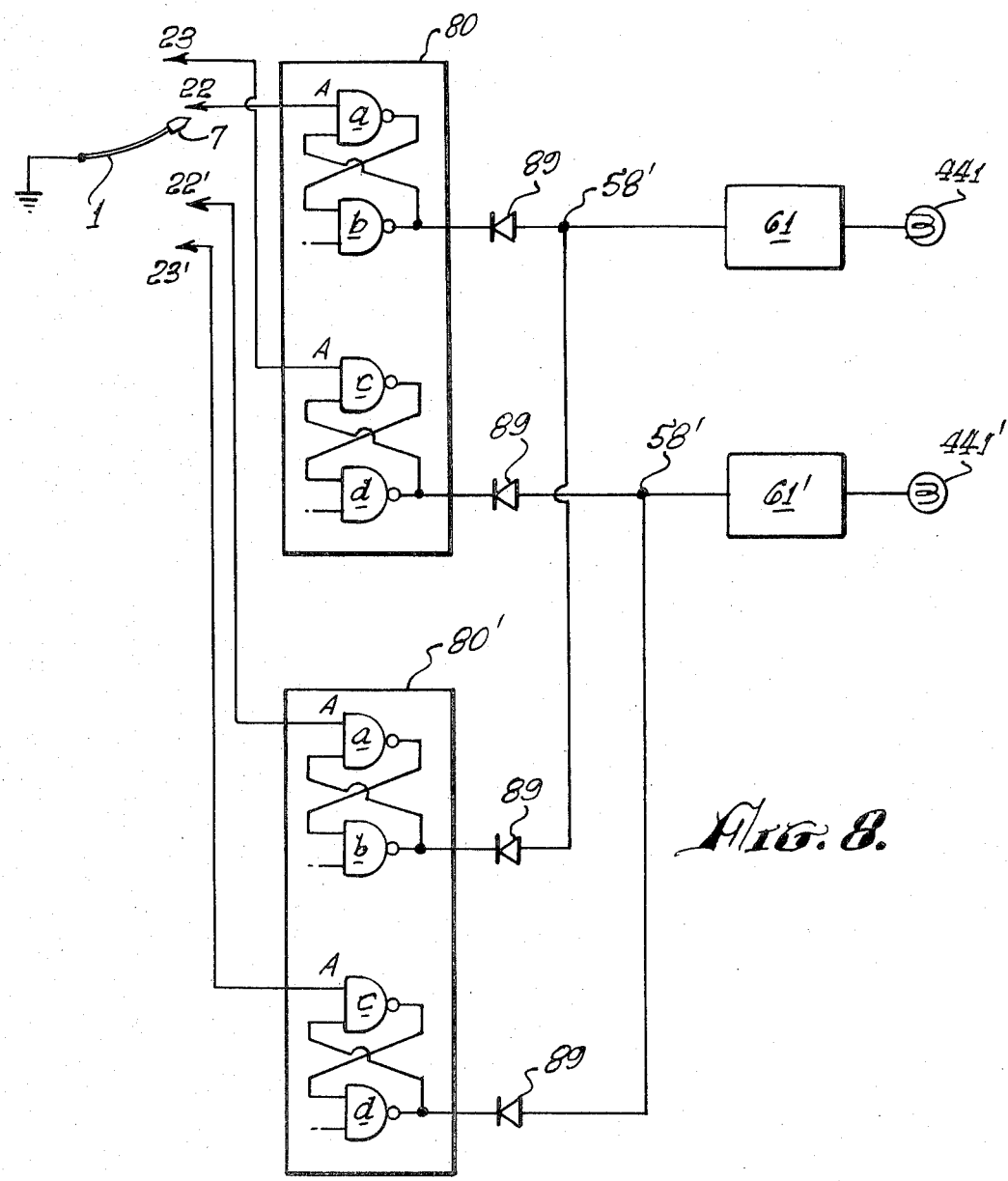
FIG. 8 is a block diagram illustrating the allocation of multiply-packaged integrated circuits in the annunciator system.

FIG. 8 illustrates more clearly the novel allocation of integrated circuits, in their various packages, in the annunciator system. 80, 80' indicate two separate commercial integrated circuit packages, each containing four gate circuits $a, b, c, d$. They are interconnected in pairs, the same as in FIG. 6, to form flip-flop circuits. A single reed 1 is disposed to make contact with either of two stationary contacts 22, 22' at predetermined displacements on opposite sides of center, such as 70 percent of maximum displacement. The flip-flop which serves contact 22 is located in package 80, gates $a$ and $b$. The flip-flop which serves the opposite contact 22' is located in another package 80', made up of gates $a$ and $b$ therein. If one package 80 or 80' should fail, the other is still there to operate as soon as the reed 1 reaches the opposite end of its oscillatory swing. Similarly, other contacts 23, 23' which are located at, say 100 percent of full deflection of reed 1, are served by pairs of gates connected as flip-flop circuits in separate packages, as shown in FIG. 8. The outputs of the above pairs of gates go through diodes 89 to annunciator display driving circuits 61, 61', which are constituted similarly to the circuit 61 in FIG. 6. Thus, the flip-flop circuit $a$-$b$ in package 80, and the flip-flop circuit $a$-$b$ in package 80', FIG. 8, constitute a flip-flop pair exactly the same as the pair 32-33, 34-35 in the block 60 in FIG. 6; and both feed a common driver circuit 61, the same as in FIG. 6. Points 58' in FIG. 8 correspond to point 58 of FIG. 6. This novel allocation enhances the reliability of the system, and can obviously be extended to the contacts such as 22, 23, of all the reeds in any instrument.

Further evidence of the reliability of the system may be seen by referring back to FIG. 6. Here, if one of the flip-flop circuits, such as 32-33, fails in such a way that its output, as at point 30Z, stands at positive supply potential, $+V_s$, its output diode 36 effectively disconnects it from the driver input point 58. Thereby, its failure does not affect the operability of the other flip-flop circuit 31 (gates 34, 35), which can still actuate the driver circuit 61.

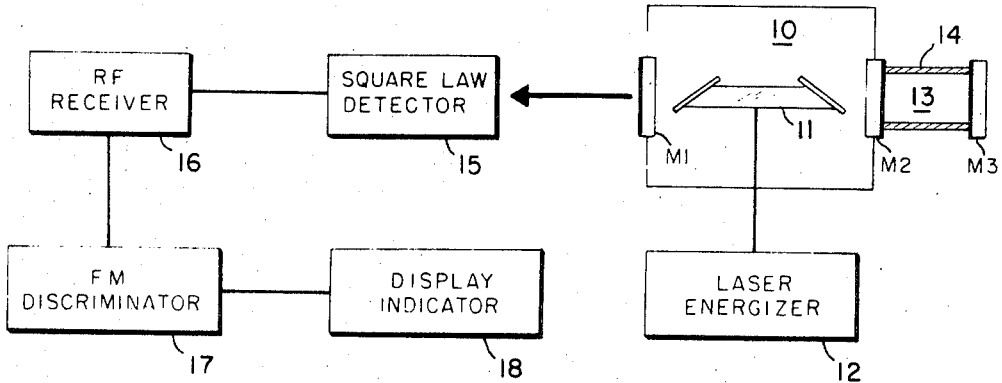

We claim:

1. An instrument and annunciator for recording transient seismic accelerations, comprising:
   an array of substantially coplanar resonant reeds of progressively graded natural frequencies;
   a mass, a stylus suspension spring, and a stylus on the free end portion of each said reed; and
   a separate stationary, substantially rigid, record plate disposed in mechanical recording relation to each said stylus and substantially parallel to its plane of oscillation;
   at least some of said reeds being long and thin enough to experience substantial transverse inertial twisting when deflected with consequent secondary deflections normal to said plane;
   the free end portions of such reeds being provided with rollers disposed to roll along portions of said record plates to support said reeds against and to limit said secondary deflections.

2. An instrument and annunciator as in claim 1, wherein:
   each said roller is positioned outward beyond each said stylus in a position to intercept the intrusion of human fingers, tools, or the like, and protect said stylus suspension spring and stylus from damage therefrom.

3. An instrument and annunciator as in claim 1, wherein:
   said rollers are sized to allow small predetermined clearances between them and adjacent record plates, and
   said stylus suspension springs are pre-bent to a deflection larger than said clearance,
   whereby each said stylus is constrained to remain always in recording contact with each said record plate.

4. An instrument and annunciator as in claim 1, further comprising:
   viscous elastomeric damping means on said reeds,
   said damping means comprising at least one strip of metal foil bonded to portions of each said reed with a layer of an elastomeric material,
   deflections of said reeds straining said elastomeric material in shear to impose viscous damping on the oscillations of said reeds.

5. An instrument and annunciator as in claim 1, further comprising:
   stylus damping means on at least a portion of each said stylus suspension spring and comprising a strip of metal foil bonded thereto with a layer of adhesive elastomeric material,
   deflections of said stylus suspension springs straining said elastomeric material in shear to impose viscous damping and prevent chattering of said stylus.

6. An instrument and annunciator as in claim 1, further comprising:
   reed contacts on the free end portions of said reeds, and
   stationary electrical contacts adapted to be engaged thereby upon deflections of said reeds to predetermined amplitudes;
   said stationary contacts being connected to flip-flop circuits to change their states upon engagement of said stationary contacts by said reed contacts,
   output connections from the outputs of said flip-flop circuits to the inputs of display device driving circuits, and
   electrically-actuated display devices actuable from said driving circuits,
   said display devices displaying the fact of said engagement and retaining their actuations until reset.

7. An instrument and annunciator as in claim 6, wherein:
   each said flip-flop circuit has an output terminal and each said driving circuit comprises an input transistor,
   a diode is connected between said output terminal and the base of said input transistor, and
   the emitter of said input transistor is connected to a point of constant potential,
   a state-setting current path being defined from said point through the base-emitter junction of said input transistor and through said diode to said output terminal,
   whereby each said flip-flop circuit is automatically set to a predetermined state wherein its output terminal is at the potential of said point when the system is turned on.

8. An instrument and annunciator as in claim 6, further comprising:
a reset bus,
connections from said bus to one input terminal of each of said flip-flop circuits, and
a manual reset switch to connect said bus momentarily to a point of predetermined potential to reset all said flip-flop circuits to a predetermined state.

9. An instrument and annunciator as in claim 6, further comprising:
a test bus,
an individual diode connected between the base circuit of each said input transistor and said test bus, and
a manual test switch connected between said bus and a point of predetermined potential,
closure of said test switch causing each said input transistor to conduct and thereby activate said driving circuits and energize said display devices.

10. An instrument and annunciator as in claim 6, wherein said flip-flop circuits have input impedances greater than $10^7$ ohms, thereby being actuable by said contacts even in the presence of high contact resistance.

11. An instrument and annunciator as in claim 6, wherein:
said flip-flop circuits are made up of interconnected pairs of integrated gate circuits,
a plurality of said gate circuits are contained in a single package and a plurality of said packages comprise a portion of said annunciator,
at least two pairs of said stationary electrical contacts are provided in contactible relation to each said reed contact, each contact of a pair being located at opposite points corresponding to substantially equal deflection of said reed contacts, and
each contact of each said pair is connected to input terminals of flip-flop circuits in separate packages, whereby failure of a said package will cause loss of annunciation at one end of said deflection, but not at the other.

* * * * *

United States
Smiley

[11] 3,808,557
[45] Apr. 30, 1974

[54] HIGH-SENSITIVITY LASER ACOUSTIC DETECTOR

[76] Inventor: Vern N. Smiley, 1040 Bowman Dr., Reno, Nev. 89503

[22] Filed: May 21, 1971

[21] Appl. No.: 145,978

[52] U.S. Cl. ........ 332/7.51, 331/94.5 A, 181/.5 AP, 73/71.1, 356/106
[51] Int. Cl. .............................................. H01s 3/05
[58] Field of Search.............. 332/7.51; 331/94.5 H; 181/.5 AP; 73/71.1; 340/3 A; 356/106, 256

[56] References Cited
UNITED STATES PATENTS

| | | | |
|---|---|---|---|
| 3,563,664 | 2/1971 | Campbell et al. | 356/106 |
| 3,409,370 | 11/1968 | King et al. | 356/51 |
| 3,476,483 | 11/1969 | Weeks | 356/256 |
| 3,326,078 | 6/1967 | Clarke et al. | 73/71.3 |
| 3,559,102 | 1/1971 | Atsufumi et al. | 332/7.51 |
| 3,605,039 | 9/1971 | Harris et al. | 331/94.5 A |

FOREIGN PATENTS OR APPLICATIONS

| | | | |
|---|---|---|---|
| 193,026 | 5/1970 | Great Britain | 332/7.51 |

*Primary Examiner*—Maynard R. Wilbur
*Assistant Examiner*—N. Moskowitz
*Attorney, Agent, or Firm*—R. S. Sciascia; G. J. Rubens; J. W. McLaren

[57] ABSTRACT

A laser assembly having an active portion and at least one passive portion as defined by optically resonant cavities included between spaced reflective surfaces is tuned so as to operate in two axial modes producing two different frequencies of laser energy. Any change in the optical length of the passive optically resonant cavity causes a concomitant change in one of the two frequencies produced by the laser assembly. Thus, sound waves intercepted by the passive resonant cavity portion of the assembly cause a change in its effective optical length and a resultant concomitant change in the second frequency produced. When the two frequencies are hetrodyned the beat frequency which is developed is a function of the amplitude of the intercepted sound waves and can be converted into an appropriate signal by a photo-responsive device. Changes in the frequency are suitably detected and indicated for display or recording. The optical length of the passive resonant cavity is changed in response to sound waves intercepted transversely to its long axis as a result of a change of the index of refraction in the medium between the spaced reflective surfaces of the passive resonant cavity; alternatively, acoustic energy in the form of sound waves impinging upon one of the reflective surfaces will cause it to be slightly displaced along the major axis of the assembly thus physically changing the optical length of the passive resonant cavity with a consonant change in the second frequency produced by the two mode operation of the laser assembly.

4 Claims, 5 Drawing Figures